United States Patent [19]
Tanino

[11] Patent Number: 4,919,195
[45] Date of Patent: Apr. 24, 1990

[54] CONTROL SYSTEM FOR AIR CONDITIONER
[75] Inventor: Mikio Tanino, Hadano, Japan
[73] Assignee: Nissan Motor Company, Limited, Yokohama, Japan
[21] Appl. No.: 144,206
[22] Filed: Jan. 15, 1988
[30] Foreign Application Priority Data
Jan. 16, 1987 [JP] Japan .................................. 62-6222
[51] Int. Cl.$^5$ ............................................ F25B 29/00
[52] U.S. Cl. ........................................ 165/12; 165/16; 165/25; 165/30; 165/40; 165/42; 165/43; 236/49.3
[58] Field of Search ........................ 165/12, 16, 25, 30, 165/40, 42, 43; 236/49

[56] References Cited
U.S. PATENT DOCUMENTS

| | | | |
|---|---|---|---|
| 4,407,446 | 10/1983 | Iijima et al. | 165/42 |
| 4,487,254 | 12/1984 | Hayashibara | 165/16 |
| 4,498,309 | 2/1985 | Kobayashi et al. | 165/43 |
| 4,540,040 | 9/1985 | Fukumoto et al. | 165/30 |
| 4,580,620 | 4/1986 | Fukumoto et al. | 165/12 |
| 4,615,481 | 10/1986 | Tanaami et al. | 165/40 |

Primary Examiner—John Ford
Attorney, Agent, or Firm—Foley & Lardner, Schwartz, Jeffery, Schwaab, Mack, Blumenthal & Evans

[57] ABSTRACT

An air conditioner system for an automotive vehicle includes means for detecting the difference between a desired temperature of the air in a vehicular cabin and the temperature therein within a predetermined range to increase the blower speed and simultaneously the path area of an air mix door, through which the air is introduced into a heating air source, so as to increase the conditioning air temperature toward the target temperature without changing the temperature in the vehicular cabin. This increasing of blower speed and discharge temperature can occur at the expiration of a given time interval or by a manual actuation.

14 Claims, 9 Drawing Sheets

CONTROL SYSTEM FOR AIR CONDITIONER

BACKGROUND OF THE INVENTION

1. Field of the Invention

The present invention relates generally to a control system for automotive automatic air conditioners. More specifically, the invention relates to a system for automatically controlling discharge air temperature and discharge air flow rate in automotive air conditioners.

2. Description of the Prior Art

Automotive air conditioners generally produce air flow due to rotation of a blower which is disposed within a duct body at a location near inlets thereof. The air flow produced by the blower passes through an evaporator of a cooler unit. Thereafter, a part of the air flow passes through a heater core or heat exchanger of a heater unit to be supplied to an air mix chamber and the rest thereof is directly supplied to the air mix chamber. The conditioning air is selectively discharged from a chest vent, foot vent or defroster nozzle. An air-mix door is pivotably provided between the evaporator and the heater core so that the ratio of the air flow passing through the heater core to the air flow by passing the heater core is determined by the opening angle of the air-mix door. Therefore, in such automotive air conditioners, discharge air temperature and air flow rate are determined by the opening angle of the air-mix door and by the operation voltage applied to the blower, respectively.

The opening angle of the air-mix door and the blower voltage are determined by control parameters, such as a manually selectable target temperature, atmospheric temperature, the air temperature in the vehicular cabin, insolation and so forth. When the cabin temperature is relatively high, the air discharge rate is made relatively large in order to rapidly decrease the cabin temperature. As the cabin temperature decreases, the temperature of the discharge air decreases. Therefore, the blower voltage is decreased gradually as the temperature of the vehicular cabin decreases in order to prevent the cabin temperature from becoming lower than the target temperature. Accordingly, the operation voltage applied to the blower is designed to be a minimal value $V_{LO}$ when the difference between the cabin temperature and the target temperature is lower than a predetermined value.

In such types of control systems for air conditioners, the occupant in the vehicular cabin may feel that the discharge air flow is too cool when he is directly exposed to the discharge air flow, since the discharge air temperature is very much cooler than the cabin temperature.

SUMMARY OF THE INVENTION

It is therefore a principal object of the present invention to provide an air conditioner system for an automotive vehicle which can increase the discharge air temperature without changing the temperature in the vehicular cabin when the cabin temperature approaches the target temperature.

In order to accomplish the aforementioned and other specific objects, an automotive air conditioner system includes a control unit which increases the open angle of an air-mix door and the operation voltage applied to a blower after the difference between the target temperature and the room temperature in the vehicular cabin becomes lower than a predetermined value.

According to one aspect of the present invention, the air conditioner system comprises:

a conditioning air passage means which includes a cooling air source for generating cooling air, a heating air source for generating heating air, and conditioning air generating means for mixing a controlled proportion of cooling air and heating air for adjusting the temperature of conditioning air to be discharged into a vehicular cabin;

temperature setting means for allowing manual setting of a desired temperature of the conditioning air in the vehicular cabin to produce a first signal indicative of the set temperature;

sensor means for monitoring temperature in the vehicular cabin to produce a second signal indicative of the vehicular cabin temperature;

first control means for adjusting a discharge amount of the conditioning air into the vehicular cabin depending upon the difference between the first and second signal values, the first control means reducing the discharge amount toward a predetermined minimum value; and second control means for controlling the conditioning air generating means for deriving a mixing rate of the cooling air and heating air for adjusting the conditioning air temperature on the basis of the first and second signal values, the second control means detecting the first and second signal values within a predetermined range of operate the conditioning air generating means so as to adjust the conditioning air temperature toward the set temperature without essentially changing the temperature in said vehicular cabin.

The second control means may control the conditioning air generating means to increase the proportion of the heating air at a given rate for adjusting the conditioning air temperature toward the set temperature. The first control means may be cooperative with the second control means and responsive to the latter controlling the conditioning air generating means for adjusting the conditioning air temperature toward the set temperature, to increase the discharge amount of the conditioning air for a given rate. The conditioning air generating means may include an air-mix door changing path area, through which the air is introduced into the heating air source, the path area being changeable between a fully open position at which the path area is maximum and a fully closed position at which the path area is minimum. The first control means may adjust voltage applied to a blower motor so as to control blower speed. The second control means may detect the difference between the first and second signal values within the predetermined range to increase the path area and the voltage synchronized with each other. Preferably, the sensor means comprises a cabin temperature sensor for monitoring the temperature in the vehicular cabin, an atmospheric temperature sensor for monitoring atmospheric temperature and an insolation sensor for monitoring insolation, and producing the second signal in response to the temperature in the vehicular cabin, the atmospheric temperature and the insolation. The second means may include a trimmer which is manually operable in response to the difference between the first and second signal values within the predetermined range, and an adjust command generator increasing the path area and the voltage in accordance with the manual operation of the trimmer.

According to another aspect of the invention. the control system comprises:

sensor means for monitoring temperature in a vehicular cabin to produce a first signal indicative of the vehicular cabin temperature;

temperature setting means for allowing manual setting of a desired temperature of the air in said vehicular cabin to produce a second signal indicative of the set temperature;

first control means for adjusting the discharge amount of conditioning air to be discharged into the vehicular cabin depending upon the difference between the first and second signal values, the first control means reducing the discharge amount toward a predetermined minimum value;

second control means for adjusting the temperature of the conditioning air depending upon the discharge amount; and third control means for controlling the first and second control means for adjusting the discharge amount and conditioning air temperature on the basis of the first and second signal values, the third means detecting the difference between the first and second signal values within a predetermined range for operating the first and second control means to adjust the conditioning air temperature toward the set temperature without changing the temperature in the vehicular cabin.

The second control means may include an air-mix door changing path area, through which the air is introduced into a heating air source, the path area being changeable between a fully open position at which the path area is maximum and a fulley closed position at which the path area is minimum. The first control means may adjust voltage applied to a blower motor so as to control blower speed. The third control means may detect the difference between the first and second signal values within the predetermined range which, in the preferred embodiments, is when the first and second signal values are equal to increase the path area and the voltage synchronized with each other. Preferably, the sensor means comprises a cabin temperature sensor for monitoring the temperature in the vehicular cabin, an atmospheric temperature sensor for monitoring atmospheric temperature and an insolation sensor for monitoring insolation, and produces the second signal in response to the temperature in the vehicular cabin, the atmospheric temperature and the insolation. The third means may include a trimmer which is manually operable in response to the difference between the first and second signal values within the predetermined range, and an adjust command generator increasing the path area and the voltage in accordance with the manual operation of the trimmer.

DESCRIPTION OF THE PREFERRED EMBODIMENT

Figure 1:
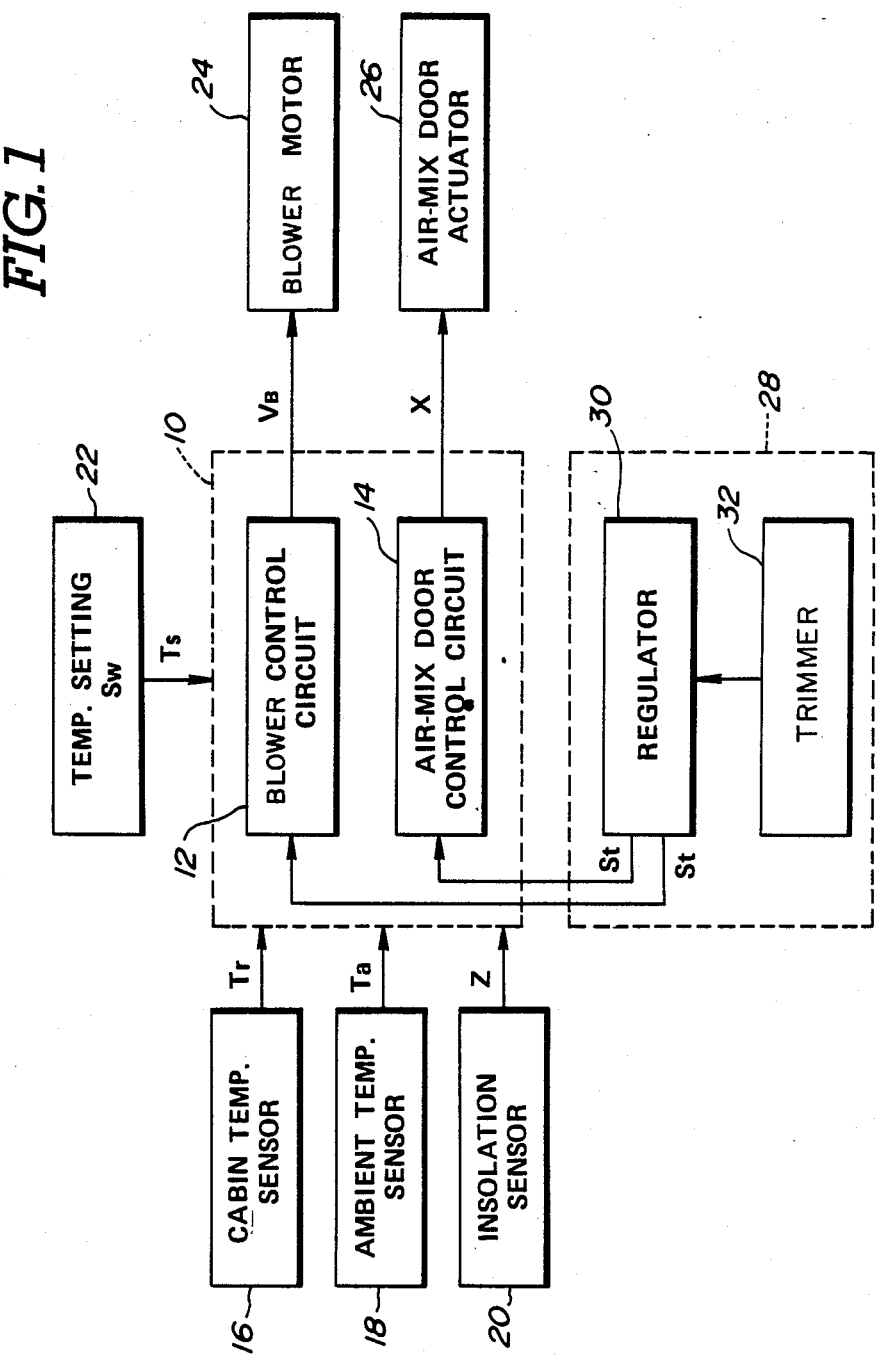
FIG. 1 is a schematic block diagram of the first preferred embodiment of an air conditioner system according to the present invention.

Referring now to the drawings, particularly to FIGS. 1 to 4, the first preferred embodiment of a control system for an automotive air conditioner, according to the present invention, includes a first control unit 10 which comprises a blower control circuit 12 and an air-mix door control circuit 14. The first control unit 10 is electrically connected to a cabin temperature sensor 16 for monitoring cabin temperature Tr in a vehicular cabin, an ambient temperature sensor 18 for monitoring ambient temperature Ta and an insolation sensor 20 for monitoring the magnitude of insolation Z. The cabin temperature sensor 16 produces a sensor signal indicative of the temperature Tr as monitored. The sensor signal outputted from the cabin temperature sensor 16 will be hereafter referred to as "Tr sensor signal". The ambient temperature sensor 18 produces a sensor signal indicative of the ambient temperature Ta, which sensor signal will be hereafter referred to as "Ta sensor signal". The insolation sensor 20 outputs a sensor signal indicative of the insolation value Z, which sensor signal will be hereafter referred to as "Z sensor signal". The control unit 10 is also connected to a manual operation switch assembly 22 which includes a switch unit for manually setting a desired cabin temperature Ts. The manual operation switch assembly 22 selectively sets the desired cabin temperature Ts and generates a signal indicative of the set cabin temperature, which signal will be hereafter referred to as "Ts signal".

The manual operation switch assembly 22 may also include a plurality of switches, such as a mode selector switch which allows manual selection of operation mode among VENT, Bi-LEVEL, HEATER and DEF (defroster) modes, a manual blower speed selection switch and so forth. The manual operation switch assembly 22 may further include an AUTO mode selector switch for ordering full automatic operation of the air conditioner system.

Figure 11:
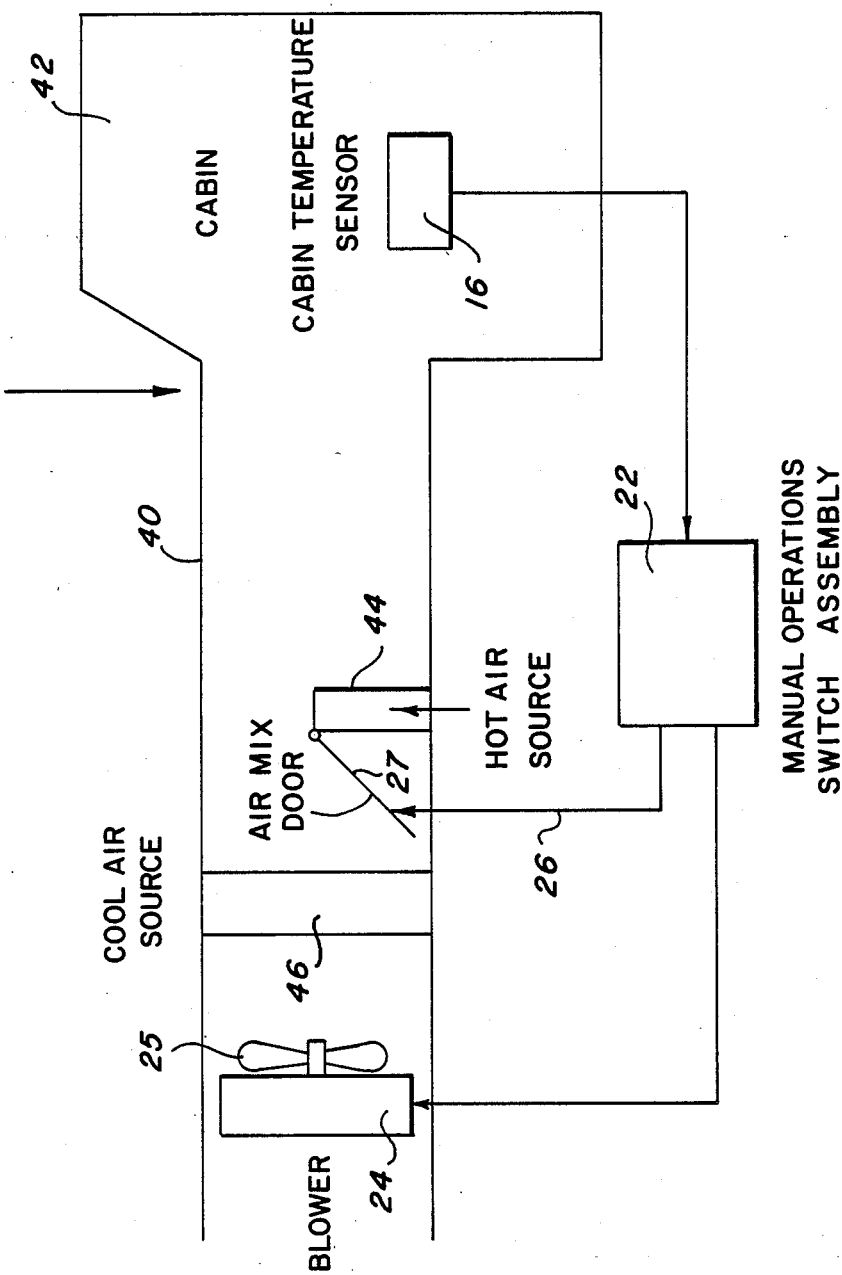
FIG. 11 is a schematic diagram of the present invention as it appears installed in a vehicle

As mentioned above, the first control unit 10 comprises the blower control circuit 12 and the air-mix door control circuit 14. The blower control circuit 12 is electrically connected to a blower motor 24 which drives a blower 25 (FIG. 11). The blower control circuit 12 receives the Ts signal, Tr sensor signal, Ta sensor signal and Z signal to produce a blower control signal, by which the magnitude of voltage Vb applied to the blower motor 22 is determined. The blower control signal is hereafter referred to as "Vb signal". The Vb signal is produced in accordance with a given program of a memory storage provided in the blower control circuit 12. The air-mix door control circuit 14 is electrically connected to an air-mix door actuator 26 which drives an air-mix door 27 (FIG. 11). The air-mix door is pivotable between a fully open position in which the percentage of air passing through a heating unit is maximal and a fully closed position in which the percentage is essentially zero. The air-mix door may adjust the temperature of the conditioning air in accordance with the position thereof. The air-mix door control circuit 14 receives the Ts signal, Tr sensor signal, Ta sensor signal and Z signal to produce an air-mix door control signal, by which the opening angle of the air-mix door is determined. The air-mix door control signal is hereafter referred to as "X signal". The X signal is produced in accordance with a given program of a memory storage provided in the air-mix door control circuit 14.

Figure 2:
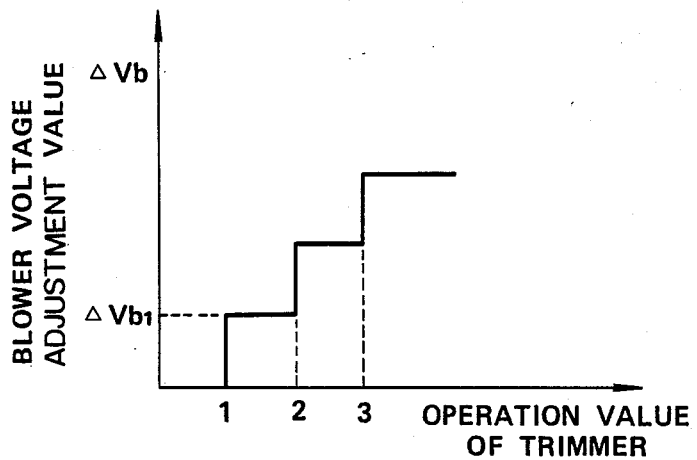
FIG. 2 is a graph of the relationship between the increased blower voltage ΔVb and operation value of the trimmer in the system of FIG. 1.
Figure 3:
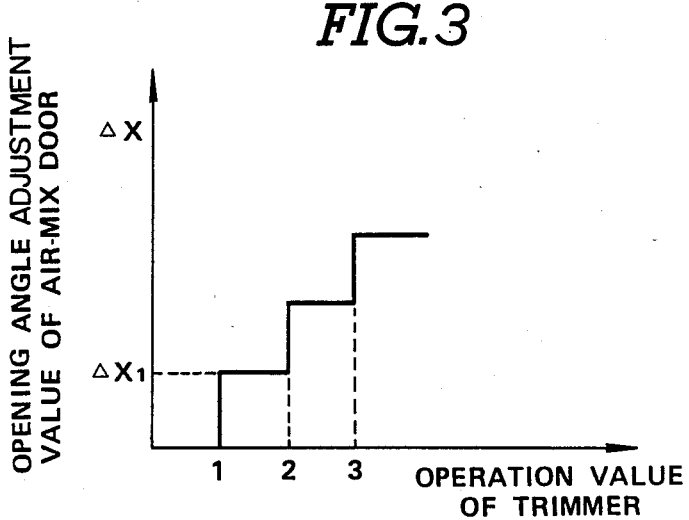
FIG. 3 is a graph of the relationship between the increased open angle ΔX of the air-mix door and operation value of the trimmer in the system of FIG. 1.
Figure 4:
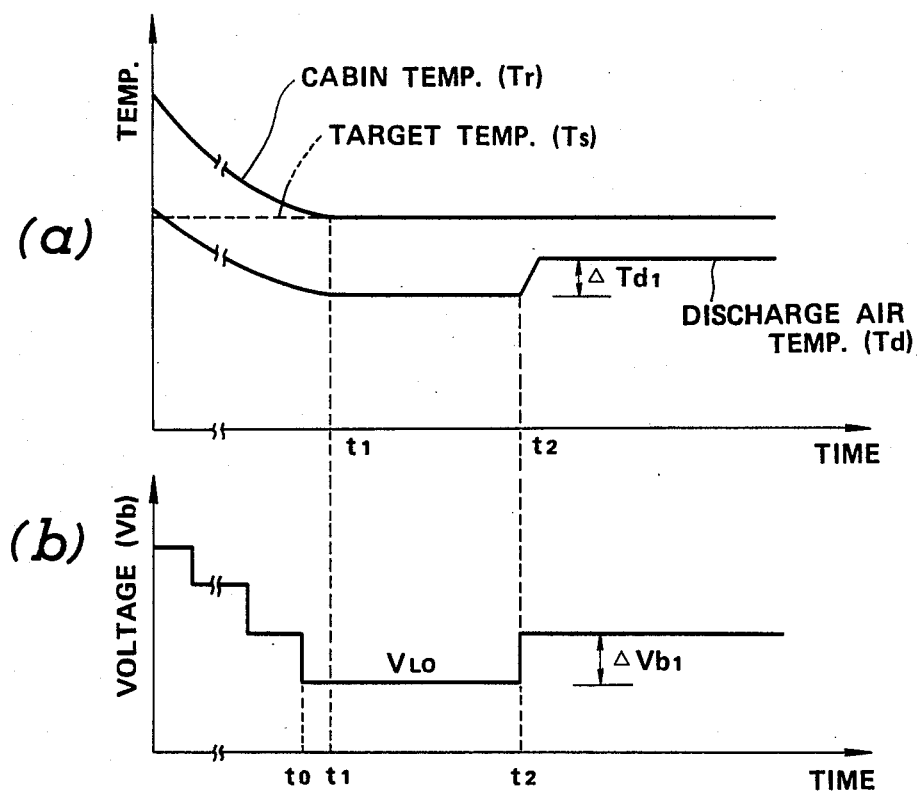
FIG. 4(a) is a graph showing the cabin temperature and the discharge air temperature in relation to time in the system of FIG. 1.
FIG. 4(b) is a graph of the voltage applied to the blower motor in relation to time in the system of FIG. 1.

The first control unit 10 is electrically connected to a second control unit 28 which comprises a adjusting command generator 30 and a manually operable trimmer 32. Specifically, the blower control circuit 12 and the air-mix door control circuit 14 of the first control unit 10 are connected to the adjusting command generator 30 of the second control unit 28. The adjusting command generator 30 is also connected to the manually operable trimmer, e.g., a switch 32. The adjusting command generator 30 produces a signal in accordance with the manual operation of the trimmer 32. The signal outputted from the adjusting command generator 30 is hereafter referred to as "St signal". The St signal is fed to the blower control circuit 12 and the air-mix door control circuit 14. The blower control circuit 12 outputs a signal to the blower motor 24 in response to the St signal so as to increase voltage Vb applied to the blower motor 24. The signal outputted from the blower control circuit 12 is hereafter referred to as "Vb signal". As shown in FIG. 2, the trimmer 32 is manually adjustable to have various operation values, such as numerals "0", "1", "2", "3" and more. When the operation value of the trimmer 32 is "0", the voltage Vb is not changed. When the operation value is "1", the voltage Vb increases by an adjustment value $\Delta Vb_1$. When the operation value is "2", the voltage adjustment value $\Delta Vb$ is two times the adjustment value $\Delta Vb_1$. Similarly, the voltage adjustment value $\Delta Vb$ is three times the adjustment value $\Delta Vb_1$ when the operation value is "3". That is, the voltage adjustment value $\Delta Vb$ increases in steps as the operation value of the trimmer condenser 32 increases. The adjustment value $\Delta Vb_1$ is previously determined by testing the air conditioner. On the other hand, the air-mix door control circuit 14 outputs a signal to the air-mix door actuator 26 in response to the St signal so as to increase the opening angle X of the air-mix door. The signal outputted from the air-mix door control circuit 14 is hereafter referred to as "X signal". As shown in FIG. 3, when the operation value of the trimmer 32 is "1", the opening angle of the air-mix door increases by an adjustment opening angle $\Delta X_1$. When the operation value is "2", the adjustment opening angle $\Delta X$ is two times the $\Delta X_1$. Similarly, the adjustment opening angle $\Delta X$ is three times the angle $\Delta X_1$ when the operation value is "3". That is, the adjustment opening angle also increases in steps as the operation value increases. The adjustment opening angle $\Delta X_1$ is also previously determined by testing the air conditioner.

With this construction, when the target air temperature is set at a temperature Ts by means of the manual operation switch assembly 22 (FIG. 11), the temperature Tr in the vehicular cabin decreases gradually to be equal to the target air temperature Ts at the time $t_1$ and thereafter is constant as shown in FIG. 4(a). In order to cause the cabin temperature Tr to be equal to the target air temperature, the discharge air temperature Td always has to be lower than the cabin temperature Tr. Therefore, the discharge air temperature Td decreases gradually to become constant at the time $t_1$. In order to achieve the aforementioned effect, the voltage Vb applied to the blower motor 24 decreases gradually in steps to be minimal voltage value $V_{LO}$ at a premature time $t_0$ relative to the time $t_1$ as shown in FIG. 4(b). As mentioned above, the discharge air temperature is lower than the cabin temperature. Therefore, the occupant in the vehicular cabin may feel that the discharge air is too cool. In this case, the occupant can operate the trimmer 32 to increase the voltage Vb applied to the blower motor 24. When the occupant sets the operation value of the trimmer 32 at, for example, "1" at a time $t_2$, the voltage Vb increases by the adjustment value $\Delta Vb_1$ as shown in FIG. 4(b). As shown in FIG. 4(a), the discharge air temperature Td increases by the temperature $\Delta Td_1$ in response to increase of the voltage Vb.

Figure 5:
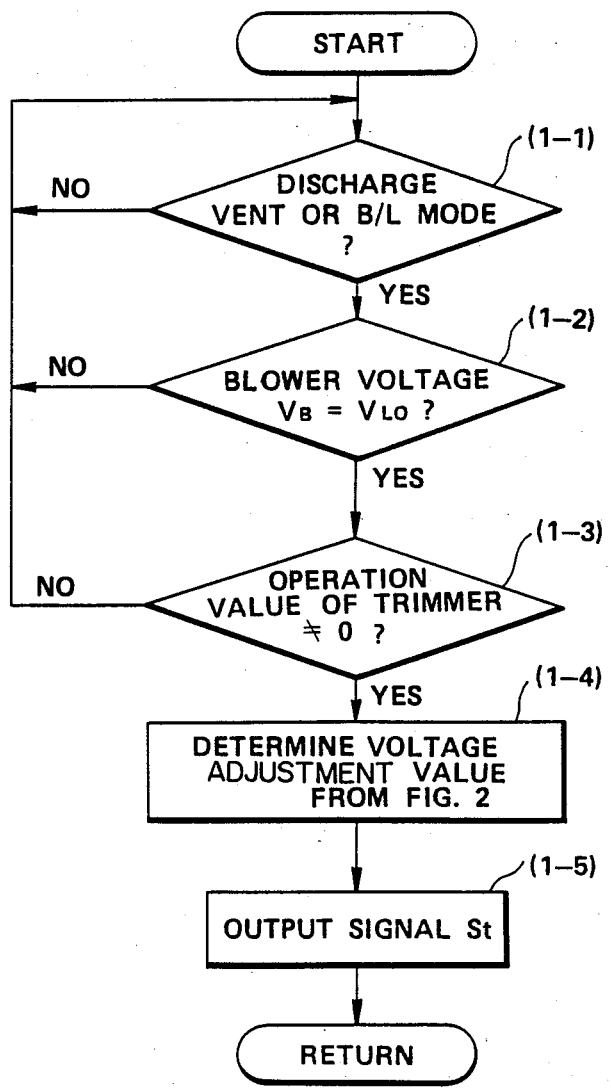
FIG. 5 is a flowchart of a program for controlling the system of FIG. 1.

FIG. 5 shows a control program to be executed by the second control unit 28 according to the first preferred embodiment of the invention. In the execution of the control program, operation mode for discharge outlets is determined at a step 1-1. When the operation mode is neither VENT nor Bi-LEVEL mode, the routine is repeated until the operation mode is either VENT or Bi-LEVEL. When the operation mode is either VENT or Bi-LEVEL mode, the routine goes to a step 1-2 and whether or not the blower voltage Vb is equal to the minimal voltage $V_{LO}$ is determined at the step 1-2. When the blower voltage Vb is not equal to the minimal voltage $V_{LO}$, the routine returns the step 1-1. When the blower voltage Vb is equal to the minimal voltage $V_{LO}$, the routine goes to a step 1-3 and whether or not the operation value of the trimmer is "0" is determined there. When the operation value is "0", the routine returns the step 1-1. When the operation value is not "0", the routine goes to a step 1-4 and there the voltage adjustment value $\Delta Vb$ is determined in accordance with the relationship shown in FIG. 1. At the next step 1-5, the adjusting command generator 30 produces the St signal which causes the blower voltage Vb to increase by the voltage adjustment value $\Delta Vb$.

Similar to the aforementioned control program, the adjustment opening angle $\Delta X$ of the air-mix door may be applied wherein the operation value of the trimmer controls angle X. The control program for the air-mix door is identical to that for the blower except that step 1-2 is eliminated since there is no need to be concerned with blower voltage when actuating the air-mix door.

Figure 6:
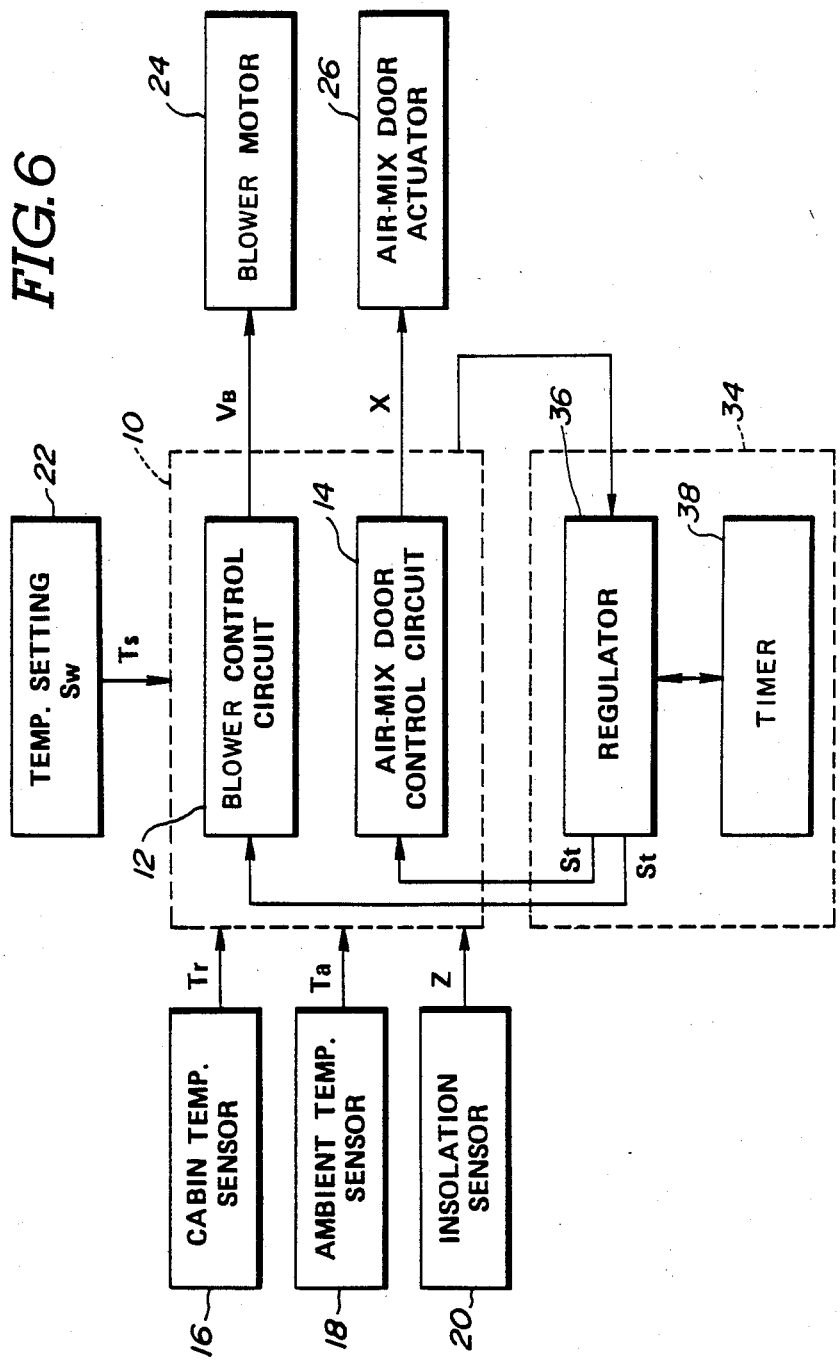
FIG. 6 is a schematic block diagram of the second preferred embodiment of an air conditioner system according to the present invention.
Figure 7:
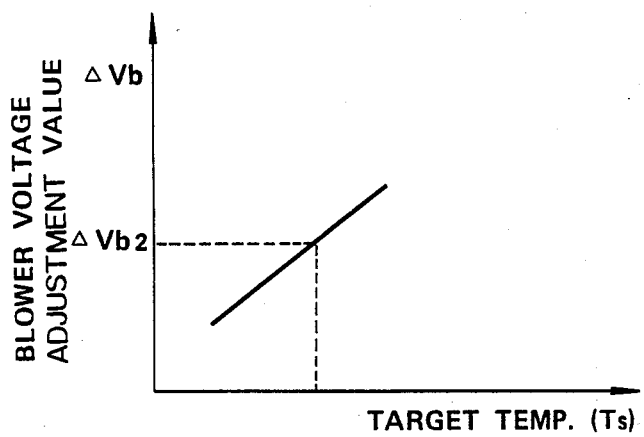
FIG. 7 is a graph of the relationship between the increased blower voltage ΔVb and the target temperature in the system of FIG. 6.
Figure 8:
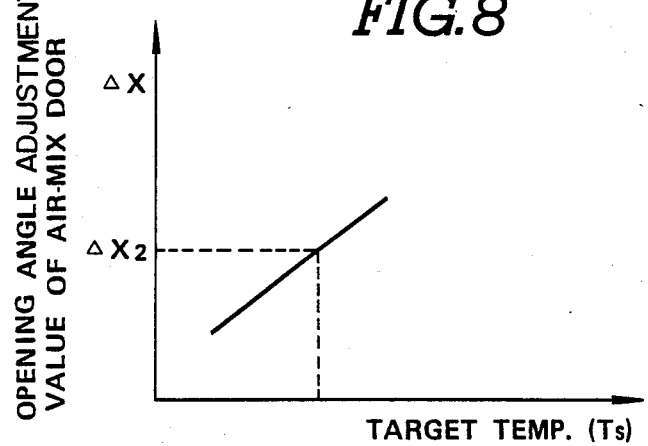
FIG. 8 is a graph of the relationship between the increased open angle ΔX of the air-mix door and the target temperature in the system of FIG. 6.

FIG. 6 shows the second preferred embodiment of a control system for an automotive air conditioner according to the present invention. In this invention, the control system includes a second control unit 34 which comprises a adjust command generator 36 and a timer 38 instead of the trimmer 32. Similar to the first embodiment, the regulator 36 is electrically connected to the blower control circuit 12 and the air-mix door control circuit 14. The adjust command generator 36 is also connected to the timer 38. The adjust command generator 36 produces the St signal after a predetermined time $t_p$ which is determined by the timer 38. The St signal is fed to the blower control circuit 12 and the air-mix door control circuit 14. The blower control circuit 12 outputs the Vb signal to the blower motor 24 in response to the St signal so as to increase voltage Vb applied to the blower motor 24. FIG. 7 shows the relationship between the target air temperature Ts and the blower voltage adjustment value $\Delta Vb$. The blower voltage adjustment value $\Delta Vb$ increases in proportion to the target air temperature Ts. The blower voltage adjustment value $\Delta Vb_2$ at a given target air temperature Ts is previously determined by testing the air conditioner. Therefore, the blower voltage adjustment value $\Delta Vb$ is automatically determined in accordance with previous operation of the manual operation switch assembly 22. On the other hand, the air-mix door control circuit 14 outputs the X signal to the air-mix door actuator 26 is response to the St signal so as to increase the open angle X of the air-mix door. As shown in FIG. 8, the opening angle adjustment value $\Delta X$ increases in proportion to the target air temperature Ts. The opening angle adjustment value $\Delta X_2$ at a given target air temperature Ts is also previously determined by testing the air conditioner. Therefore, the opening angle adjustment value $\Delta X$ is automatically determined in accordance with previous operation of the manual operation switch assembly 22.

Figure 9:
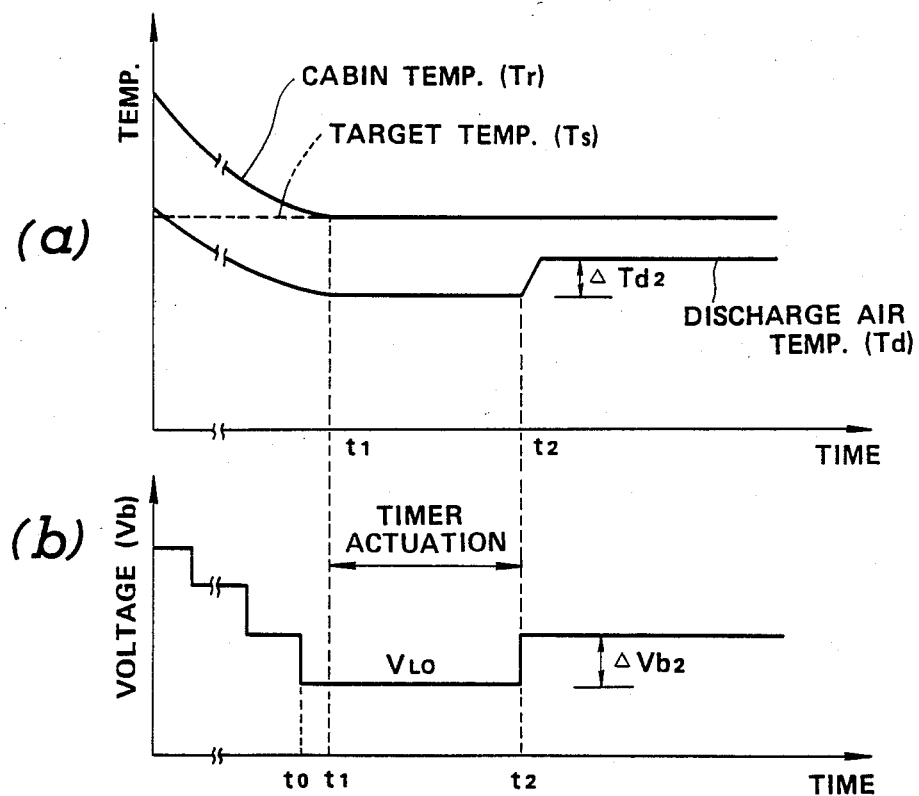
FIG. 9(a) is a graph showing the cabin temperature and the discharge air temperature in relation to time in the system of FIG. 6.
FIG. 9(b) is a graph of the voltage applied to the blower motor in relation to time in the system of FIG. 6.

With this construction, when the target air temperature is set at a temperature Ts by means of the manual operation switch assembly 22, the temperature Tr in the vehicular cabin decreases gradually to be equal to the target air temperature Ts at a time $T_1$ and thereafter is held constant as shown in FIG. 9(a). In order to cause the cabin temperature Tr to be equal to the target air temperature, the discharge air temperature Td always has to be lower than the cabin temperature Tr. Therefore, the discharge air temperature Td decreases gradually to become constant at the time $t_1$. In order to achieve the aforementioned effect, the voltage Vb applied to the blower motor 24 decreases gradually in steps to a minimal voltage value $V_{LO}$ during the time $T_0$ before the time $t_1$ as shown FIG. 9(b). When the voltage Vb becomes equal to the minimal voltage value $V_{LO}$, the timer 38 is set to measure elapsed time. After a predetermined time, the voltage Vb increases by the voltage value $\Delta Vb$, which is determined in accordance with previous operation of the manual operation switch assembly 22, at a time $t_2$ as shown in FIG. 9(b). As shown in FIG. 9(a), the discharge air temperature Td increases by $\Delta Td_2$ in response to increase of the voltage Vb.

Figure 10:
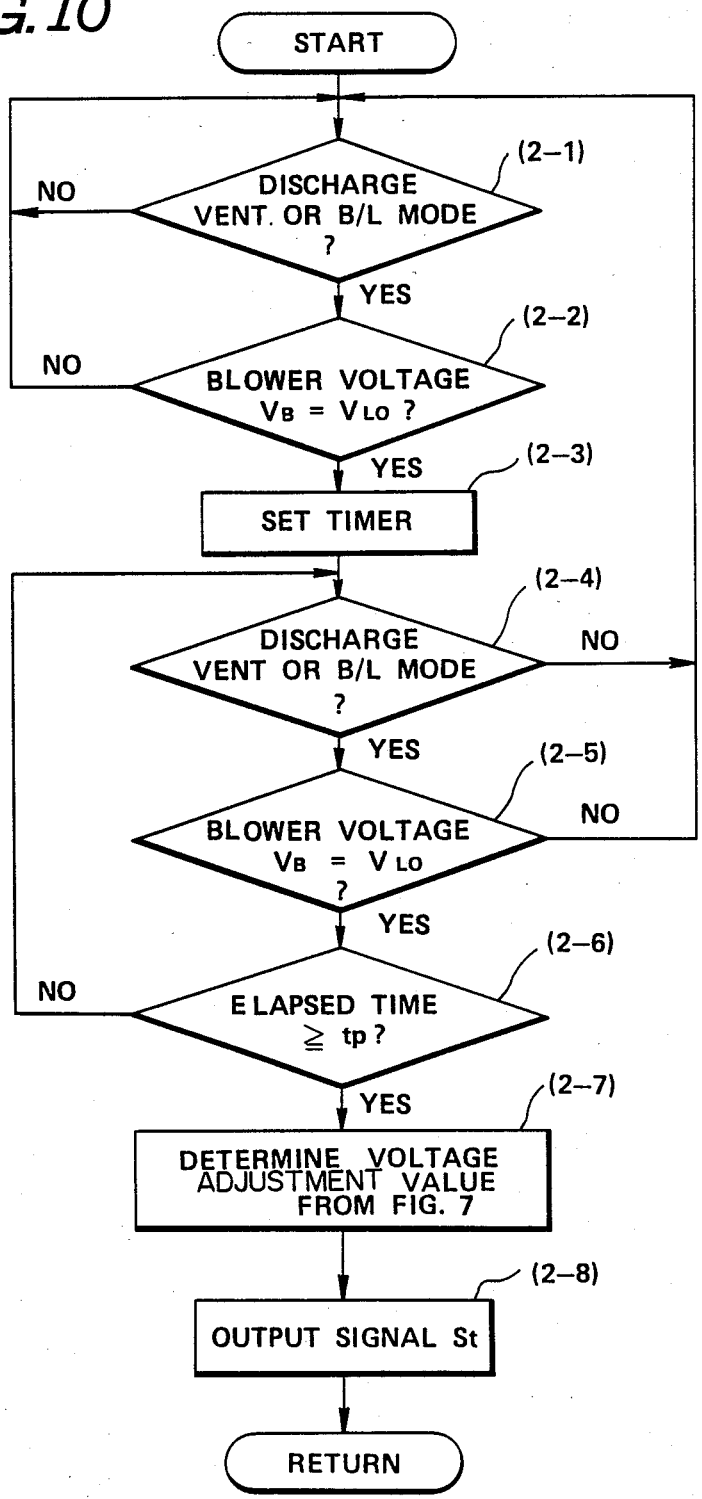
FIG. 10 is a flowchart of a program for controlling the system of FIG. 6.

FIG. 10 shows a control program to be executed by the second control unit 34 according to the second preferred embodiment of the invention. In the execution of the control program, operation mode for discharge outlets is determined at a step 2-1. When the operation mode is neither VENT nor Bi-LEVEL mode, the routine is repeated until the operation mode is either VENT or Bi-LEVEL mode. When the operation mode is either VENT or Bi-LEVEL mode, the routine goes to a step 2-2 and there whether or not the blower voltage Vb is equal to the minimal voltage $V_{LO}$ is determined. When the blower voltage Vb is not equal to the minimal voltage $V_{LO}$, the routine returns the step 2-1.

When the blower voltage Vb is equal to the minimal voltage $V_{LO}$, the routine goes to a step 2-3 and the timer 38 is set to measure elapsed time. At the next step 2-4, the operation mode for discharge outlets is determined again. When the operation mode is neither VENT nor Bi-LEVEL mode, the routine returns the step 2-1. When the operation mode is either VENT or Bi-LEVEL mode, the routine goes to a step 2-5 and there whether or not the blower voltage Vb is equal to the minimal voltage $V_{LO}$ is determined again. When the blower voltage vb is not equal to the minimal voltage $V_{LO}$, the routine returns the step 2-1. When the blower voltage Vb is equal to the minimal voltage $V_{LO}$, the routine goes to a step 2-6 and there whether or not a predetermined time had elapsed is determined. If the predetermined time has not elapsed, the routine returns the step 2-4. If the predetermined time has elapsed, the routine goes to a step 2-7 and there the voltage adjustment value $\Delta Vb$ is determined in accordance with the relationship shown in FIG. 7. At the next step 2-8, the regulator 36 produces the St signal which causes the blower voltage Vb to increase by the voltage adjustment value $\Delta Vb$.

Similar to the aforementioned control program, the opening angle adjustment value $\Delta X$ of the air-mix door may be operated wherein the operation valve of the trimmer controls angle X. The control program for the air-mix door is identical to that for the blower except that steps 2-2 and 2-5 are eliminated since there is no need to be concerned with blower voltage when actuating the air-mix door.

The components and organization of the invention are illustrated in FIG. 11. The blower motor causes the blower to provide air through passage 40 into cabin 42. The cabin temperature is sensed by sensor 16 which provides an output to the manual operation switch assembly 22. Hot air source 44 provides hot air to the aforementioned passage, while cool air source 46 provides cool air to the passage.

What is claimed is:

1. An air conditioner system for an automotive vehicle comprising:

conditioning air passage means which includes a cooling air source for generating a cooling air, a heating air source for generating a heating air, and a means for controlling the mixing ratio of said cooling and heating air for adjusting temperature of a conditioning air to be discharged into a vehicular cabin;

temperature setting means for allowing manual set of a desired temperature of the conditioning air in said vehicular cabin to produce a first signal having a value indicative of the set temperature;

sensor means for monitoring temperature in said vehicular cabin to produce a second signal having a value indicative of the vehicular cabin temperature;

first control means for adjusting volume flow and temperature of said conditioning air to be discharged into said vehicular cabin depending upon the difference between said first and second signal values, said first control means reducing said volume flow toward a predetermined minimum value, said first control means being active for controlling said conditioning air volume flow and temperature while a difference of said first and said second signal values is not within a predetermined range; and second control means for increasing volume flow and temperature of said conditioning air to be discharged into said vehicular cabin depending upon the difference between said first and second signal values, said second control means being active when said difference of said first and said second signal values is within said predetermined range, for increasing said conditioning air temperature toward said set temperature from an initial temperature upon detection of said difference within said predetermined range and correspondingly increasing said volume flow from an initial amount upon detection of said difference within said predetermined range so as to maintain a heat value of said conditioning air substantially unchanged.

2. An air conditioner system as set forth in claim 1, wherein said second control means controls said means for controlling the mixing ratio to increase the proportion of said heating air at a given rate for adjusting said conditioning air temperature toward said set temperature.

3. An air conditioner system as set forth in claim 2, wherein said first control means is cooperative with said second control means and responsive to the latter controlling said means for controlling the mixing ratio adjusting said conditioning air temperature toward said set temperature, to increase volume flow of said conditioning air for a given mixing ratio.

4. An air conditioner system as set forth in claim 3, wherein said means for controlling the mixing ratio includes an air-mix door changing path area, through which the air is introduced into said heating air source, said path area being changeable between a fully open position at which the path area is maximum and a full closed position at which the path area is minimum.

5. An air conditioner system as set forth in claim 4, wherein said first control means adjusts voltage applied to a blower motor so as to adjust blower speed.

6. An air conditioner system as set forth in claim 5, wherein said second control means detects said difference between said first and second signal values within the predetermined range to increase said path area and said voltage synchronized with each other.

7. An air conditioner system as set forth in claim 6, wherein said sensor means comprises a cabin temperature sensor for monitoring the temperature in said vehicular cabin, an atmospheric temperature sensor for monitoring atmospheric temperature and an insolation sensor for monitoring insolation, and produce said second signal in response to the temperature in said vehicular cabin, the atmospheric temperature and the insolation.

8. An air conditioner system as set forth in claim 7, wherein said second means includes a trimmer which is manually operable in response to said difference between said first and second signal value within the predetermined range, and an adjust command generator increasing said path area and said voltage in accordance with the manual operation of said trimmer.

9. An air conditioner system for an automotive vehicle comprising:

sensor means for monitoring temperature in said vehicular cabin to produce a first signal having a value indicative of the vehicular cabin temperature;

temperature setting means for allowing manual set of a desired temperature of the conditioning air in said vehicular cabin to produce a second signal having a value indicative of the set temperature;

first control means for adjusting volume flow of a conditioning air to be discharged into said vehicular cabin depending upon the difference between said first and second signal values, said first control means reducing said volume flow toward a predetermined minimum value;

second control means for adjusting temperature of said conditioning air depending upon said difference between said first and second signal values;

third control means being operable in a first mode, for controlling said first and second control means for adjusting said volume flow and conditioning air temperature on the basis of said first and second signal values so that the temperature is adjusted toward said set temperature and whereby a difference between said first and second signal values is reduced to zero, and in a second mode which is triggered when said difference between said first and second signal values is within a predetermined range, for operating said first and second control means to adjust said conditioning air temperature toward said set temperature and correspondingly adjust said volume flow for varying said conditioning air temperature toward said set temperature from an initial temperature upon detection of said difference within said predetermined range and correspondingly varying said volume flow from an initial amount upon detection of said difference within said predetermined range to maintain the heat value of said conditioning air substantially unchanged.

10. A control system as set forth in claim 9, wherein said second control means includes an air-mix door changing path area, through which the air is introduced into a heating air source, said path area being changeable between a fully open position at which the path area is maximum and a full closed position at which the path area is minimum.

11. A control system as set forth in claim 10, wherein said first control means adjusts voltage applied to a blower motor so as to adjust blower speed.

12. A control system as set forth in claim 11, wherein said third control means detects said difference between said first and second signal values within the predetermined range to increase said path area and said voltage synchronized with each other.

13. A control system as set forth in claim 12, wherein said sensor means comprises a cabin temperature sensor for monitoring the temperature in said vehicular cabin, an atmospheric temperature sensor for monitoring atmospheric temperature and an insolation sensor for monitoring insolation, and produce said first signal in response to the temperature in said vehicular cabin, the atmospheric temperature and the insolation.

14. A control system as set forth in claim 13, wherein said third control means includes a trimmer which is manually operable in response to said difference between said first and second signal value within the predetermined range, and a regulator increasing said path area and said voltage in accordance with the manual operation of said trimmer.

* * * * *